US012657389B2

(12) United States Patent
Mazor et al.

(10) Patent No.: US 12,657,389 B2
(45) Date of Patent: Jun. 16, 2026

(54) TECHNOLOGIES FOR ERROR REDUCTION IN INTENT CLASSIFICATION

(71) Applicant: Genesys Cloud Services, Inc., Menlo Park, CA (US)

(72) Inventors: Igal Mazor, Tel Aviv (IL); Yaron Ismah-Moshe, Tel Aviv (IL); Sahar Ben-Shushan, Tel Aviv (IL); Nadav Gottenstein, Tel Aviv (IL)

(73) Assignee: Genesys Cloud Services, Inc., Menlo Park, CA (US)

( * ) Notice: Subject to any disclaimer, the term of this patent is extended or adjusted under 35 U.S.C. 154(b) by 284 days.

(21) Appl. No.: 18/088,175

(22) Filed: Dec. 23, 2022

(65) Prior Publication Data

US 2024/0211693 A1     Jun. 27, 2024

(51) Int. Cl.
*G06F 40/30* (2020.01)
*G06F 40/205* (2020.01)
*G06F 40/284* (2020.01)

(52) U.S. Cl.
CPC ............ *G06F 40/30* (2020.01); *G06F 40/205* (2020.01); *G06F 40/284* (2020.01)

(58) Field of Classification Search
CPC ....... G06F 40/30; G06F 40/205; G06F 40/284
See application file for complete search history.

(56) References Cited

U.S. PATENT DOCUMENTS

| | | | | |
|---|---|---|---|---|
| 10,198,506 B2 * | 2/2019 | Qiao | ...................... | G06F 40/211 |
| 11,023,675 B1 * | 6/2021 | Neervannan | .......... | G06F 40/211 |
| 2016/0055235 A1 * | 2/2016 | Zhang | ................. | G06F 16/3344 |
| | | | | 707/749 |
| 2016/0154792 A1 | 6/2016 | Sarikaya et al. | | |
| 2018/0365228 A1 * | 12/2018 | Galitsky | ................. | G06F 40/35 |
| 2019/0340243 A1 * | 11/2019 | Beaver | .................... | G06F 40/30 |
| 2020/0065384 A1 | 2/2020 | Costello | | |

(Continued)

FOREIGN PATENT DOCUMENTS

| | | | |
|---|---|---|---|
| WO | 20160053343 A1 | 4/2016 | |
| WO | WO-2021074459 A1 * | 4/2021 | .......... H04M 3/5235 |

OTHER PUBLICATIONS

Search Report and Written Opinion received in co-pending PCT application having application No. PCT/US2023/083321.

*Primary Examiner* — Andrew C Flanders
*Assistant Examiner* — Theodore Withey
(74) *Attorney, Agent, or Firm* — Taft Stettinius & Hollister LLP

(57) ABSTRACT

A method for error reduction in intent classification according to an embodiment includes determining a set of possible intent classes for a section of input text, mapping each of the possible intent classes into a respective group of a plurality of groups, determining which groups of the plurality of groups are contradictory to one or more other groups of the plurality of groups, splitting the section of input text into a plurality of sub-parts, performing intent classification on the section of input text to determine an intent of the section of input text and on each sub-part of the plurality of sub-parts to determine a respective intent of each sub-part, evaluating the determined intent of the section of input text and the respective intents of the sub-parts for intent contradiction, and overriding the determined intent of the section of input text in response to identifying an intent contradiction.

18 Claims, 5 Drawing Sheets

(56)          References Cited

U.S. PATENT DOCUMENTS

| | | | |
|---|---|---|---|
| 2020/0143247 A1* | 5/2020 | Jonnalagadda | G06N 3/044 |
| 2020/0218781 A1* | 7/2020 | Takano | G06Q 30/016 |
| 2021/0358488 A1* | 11/2021 | Iyer | G06F 40/30 |
| 2022/0050968 A1* | 2/2022 | Xie | H04L 51/02 |
| 2022/0171936 A1* | 6/2022 | Wang | G06N 3/04 |
| 2022/0318485 A1* | 10/2022 | Narayanan | G06F 40/205 |
| 2022/0366893 A1* | 11/2022 | Qu | G10L 15/063 |

* cited by examiner

300

DETERMINE POSSIBLE INTENT CLASSES
FOR INPUT DATA — 302

MAP POSSIBLE INTENT CLASSES INTO GROUPS — 304

DETERMINE WHICH GROUPS ARE CONTRADICTORY — 306

400

TECHNOLOGIES FOR ERROR REDUCTION IN INTENT CLASSIFICATION

BACKGROUND

Natural language understanding (NLU) and other technical fields rely on intent classification to process data to infer the intent of the underlying data (e.g., using machine learning and/or rule-based approaches). For example, contact center systems may utilize intent recognition for autonomous communication via automated agents (e.g., chatbots), during automated telephony sessions, for email communications, and/or for other end user support. As such, the ability of a system to confidently infer the intent of a particular communication is important to performing appropriate actions and/or providing relevant information to the end user.

SUMMARY

One embodiment is directed to a unique system, components, and methods for error reduction in intent classification. Other embodiments are directed to apparatuses, systems, devices, hardware, methods, and combinations thereof for error reduction in intent classification.

According to an embodiment, a method for error reduction in intent classification may include determining a set of possible intent classes for a section of input text, mapping each of the possible intent classes for the section of input text into a respective group of a plurality of groups, determining which groups of the plurality of groups are contradictory to one or more other groups of the plurality of groups, splitting the section of input text into a plurality of sub-parts, performing intent classification on the section of input text to determine an intent of the section of input text and on each sub-part of the plurality of sub-parts to determine a respective intent of each sub-part, evaluating the determined intent of the section of input text and the respective intents of the sub-parts for intent contradiction, and overriding the determined intent of the section of input text in response to identifying an intent contradiction.

In some embodiments, the section of input text may be or include a paragraph of text and each sub-part of the plurality of sub-parts of the input text may be or include a sentence of the paragraph.

In some embodiments, the plurality of groups may include at least a first group of positive intents and a second group of negative intents.

In some embodiments, overriding the determined intent of the section of input text may include escalating an interaction associated with classification of the section of input text to a human.

In some embodiments, overriding the determined intent of the section of input text may include prioritizing the intent of a sub-part of the plurality of sub-parts over the intent of the section of input text.

In some embodiments, evaluating the determined intent of the section of input text and the respective intents of the sub-parts for intent contradictions may include determining, for each sub-part of the plurality of sub-parts, whether a group associated with the determined intent of the section of input text is different from a group associated with the determined intent of the sub-part, and overriding the determined intent of the section of input text may include overriding the determined intent of the section of input text in response to determining that the group associated with the determined intent of the section of input text is different from the group associated with the determined intent of the sub-part for each sub-part of the plurality of sub-parts.

In some embodiments, evaluating the determined intent of the section of input text and the respective intents of the sub-parts for intent contradictions may include (i) determining, for each sub-part of the plurality of sub-parts, whether a group associated with the determined intent of the sub-part contradicts a group associated with the determined intent of the section of input text contradicts and (ii) determining whether a confidence score of the determined intent of a sub-part having a group that contradicts the group associated with the determined intent of the section of input text exceeds a predefined threshold, and overriding the determined intent of the section of input text may include overriding the determined intent of the section of input text in response to determining the confidence score exceeds the predefined threshold.

In some embodiments, performing the intent classification on the section of input text to determine the intent of the section of input text may include generating a confidence score for each possible intent based on the section of input text, evaluating the determined intent of the section of input text and the respective intents of the sub-parts for intent contradictions may include (i) determining whether a group associated with a possible intent for the section of input text having a highest confidence score contradicts a group associated with a possible intent for the section of input text having a second highest confidence score, and (ii) determining whether a difference between the highest confidence score and the second highest confidence score is within a predefined threshold, and overriding the determined intent of the section of input text may include overriding the determined intent of the section of input text in response to determining that the difference between the highest confidence score and the second highest confidence score is within the predefined threshold.

In some embodiments, performing intent classification may include generating a respective confidence score for each possible intent classification based on an intent classification model.

In some embodiments, the method may further include performing an action based on the determined intent of the section of input text in response to determining not to override the determined intent of the section of input text.

According to another embodiment a system for error reduction in intent classification may include at least one processor and at least one memory comprising a plurality of instructions stored therein that, in response to execution by the at least one processor, causes the system to determine a set of possible intent classes for a section of input text, map each of the possible intent classes for the section of input text into a respective group of a plurality of groups, determine which groups of the plurality of groups are contradictory to one or more other groups of the plurality of groups, split the section of input text into a plurality of sub-parts, perform intent classification on the section of input text to determine an intent of the section of input text and on each sub-part of the plurality of sub-parts to determine a respective intent of each sub-part, evaluate the determined intent of the section of input text and the respective intents of the sub-parts for intent contradiction, and override the determined intent of the section of input text in response to identification of an intent contradiction.

In some embodiments, the section of input text may be or include a paragraph of text and each sub-part of the plurality of sub-parts of the input text may be or include a sentence of the paragraph.

In some embodiments, the plurality of groups may include at least a first group of positive intents and a second group of negative intents.

In some embodiments, to override the determined intent of the section of input text may include to forward an interaction associated with classification of the section of input text to a human.

In some embodiments, to override the determined intent of the section of input text may include to prioritize the intent of a sub-part of the plurality of sub-parts over the intent of the section of input text.

In some embodiments, to evaluate the determined intent of the section of input text and the respective intents of the sub-parts for intent contradictions may include to determine, for each sub-part of the plurality of sub-parts, whether a group associated with the determined intent of the section of input text is different from a group associated with the determined intent of the sub-part, and to override the determined intent of the section of input text may include to override the determined intent of the section of input text in response to a determination that the group associated with the determined intent of the section of input text is different from the group associated with the determined intent of the sub-part for each sub-part of the plurality of sub-parts.

In some embodiments, to evaluate the determined intent of the section of input text and the respective intents of the sub-parts for intent contradictions may include to (i) determine, for each sub-part of the plurality of sub-parts, whether a group associated with the determined intent of the sub-part contradicts a group associated with the determined intent of the section of input text contradicts and (ii) determine whether a confidence score of the determined intent of a sub-part having a group that contradicts the group associated with the determined intent of the section of input text exceeds a predefined threshold, and to override the determined intent of the section of input text may include to override the determined intent of the section of input text in response to a determination that the confidence score exceeds the predefined threshold.

In some embodiments, to perform the intent classification on the section of input text to determine the intent of the section of input text may include to generate a confidence score for each possible intent based on the section of input text, to evaluate the determined intent of the section of input text and the respective intents of the sub-parts for intent contradictions may include to (i) determine whether a group associated with a possible intent for the section of input text having a highest confidence score contradicts a group associated with a possible intent for the section of input text having a second highest confidence score, and (ii) determine whether a difference between the highest confidence score and the second highest confidence score is within a predefined threshold, and to override the determined intent of the section of input text may include to override the determined intent of the section of input text in response to a determination that the difference between the highest confidence score and the second highest confidence score is within the predefined threshold.

In some embodiments, to perform intent classification may include to generate a respective confidence score for each possible intent classification based on an intent classification model.

In some embodiments, the plurality of instructions may further cause the system to perform an action based on the determined intent of the section of input text in response to a determination not to override the determined intent of the section of input text.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
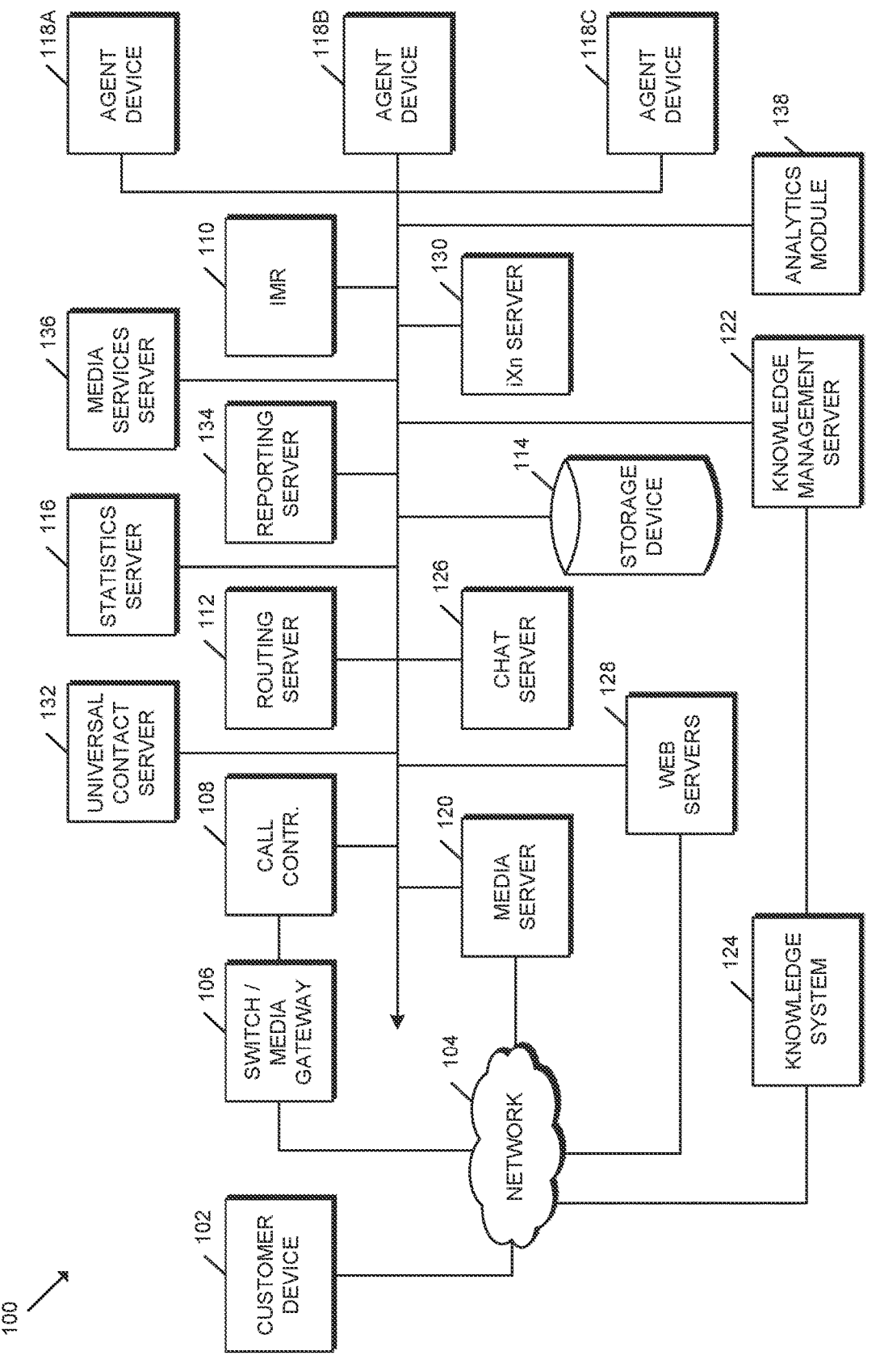
FIG. 1 depicts a simplified block diagram of at least one embodiment of a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Multi-class intent classification based on a large amount of text often poses significant challenges. For example, suppose a multi-class intent classification model has 20 intent classes for the classification of email content. In other words, the system receives an email as input text and attempts to determine the intent of the email based on the multi-class intent classification model. It is often the case that the lengthier the email, the more challenging ascertaining the intent of the email as a whole typically becomes. It should be appreciated that the technologies described herein are able to reduce the number of errors involved in intent classification.

As described in greater detail below, the technologies may involve splitting input data into sub-parts, mapping intent classes into groups based on some commonality (e.g., common process flow), determining which groups contradict one another (e.g., a "positive" intent group and a "negative" intent group), and evaluating prospective intent classes for intent contradictions. For example, in some NLP-related embodiments, the entire text to be analyzed (e.g., a text paragraph) may be split into sub-parts, such as sentences (i.e., such that each sub-part is one sentence of the text paragraph). As an initial setup, the different possible intent classes (labels) are clustered into predefined groups, with each group containing intent classes that have something in common. For example, in an embodiment, intent classes may be grouped based on intents that are "positive," intents that are "negative," and intents that are "neutral." However, it should be appreciated that different implementations may utilize different groups depending on the particular context (e.g., groups based on the similarity in subsequent actions that are triggered by the corresponding intents, etc.). Further, in some embodiments, if no intent classes have common meaning, then each class may be treated as its own group. With respect to the evaluation of prospective intent classes for intent contradictions, as described in greater detail below, it should be appreciated that the system may evaluate whether the top scoring class group of the original (e.g., entire) input data is also reflected in the class group of at least one sub-part, determine whether the respective class groups of sub-parts contradict one another, and/or determine whether the prospective intents with the highest confidence scores for the intent classification of the original (e.g., entire) input data have class groups that contradict one another.

Referring now to FIG. 1, a simplified block diagram of at least one embodiment of a communications infrastructure and/or content center system, which may be used in conjunction with one or more of the embodiments described herein, is shown. The contact center system 100 may be embodied as any system capable of providing contact center services (e.g., call center services, chat center services, SMS center services, etc.) to an end user and otherwise performing the functions described herein. The illustrative contact center system 100 includes a customer device 102, a network 104, a switch/media gateway 106, a call controller 108, an interactive media response (IMR) server 110, a routing server 112, a storage device 114, a statistics server 116, agent devices 118A, 118B, 118C, a media server 120, a knowledge management server 122, a knowledge system 124, chat server 126, web servers 128, an interaction (iXn) server 130, a universal contact server 132, a reporting server 134, a media services server 136, and an analytics module 138. Although only one customer device 102, one network 104, one switch/media gateway 106, one call controller 108, one IMR server 110, one routing server 112, one storage device 114, one statistics server 116, one media server 120, one knowledge management server 122, one knowledge system 124, one chat server 126, one iXn server 130, one universal contact server 132, one reporting server 134, one media services server 136, and one analytics module 138 are shown in the illustrative embodiment of FIG. 1, the contact center system 100 may include multiple customer devices 102, networks 104, switch/media gateways 106, call controllers 108, IMR servers 110, routing servers 112, storage devices 114, statistics servers 116, media servers 120, knowledge management servers 122, knowledge systems 124, chat servers 126, iXn servers 130, universal contact servers 132, reporting servers 134, media services servers 136, and/or analytics modules 138 in other embodiments. Further, in some embodiments, one or more of the components described herein may be excluded from the system 100, one or more of the components described as being independent may form a portion of another component, and/or one or more of the component described as forming a portion of another component may be independent.

It should be understood that the term "contact center system" is used herein to refer to the system depicted in FIG. 1 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 100), the associated customer service provider (such as a particular customer service provider/agent providing customer services through the contact center system 100), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chat-bots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 100 may be used by a customer service provider to provide various types of services to customers. For example, the contact center system 100 may be used to engage and manage interactions in which automated processes (or bots) or human agents communicate with customers. As should be understood, the contact center system 100 may be an in-house facility to a business or enterprise for performing the functions of sales and customer service relative to products and services available through the enterprise. In another embodiment, the contact center system 100 may be operated by a third-party service provider that contracts to provide services for another organization. Further, the contact center system 100 may be deployed on equipment dedicated to the enterprise or third-party service provider, and/or deployed in a remote computing environment such as, for example, a private or public cloud environment with infrastructure for supporting multiple contact centers for multiple enterprises. The contact center system 100 may include software applications or programs, which may be executed on premises or remotely or some combination thereof. It should further be appreciated that the various components of the contact center system 100 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 200, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 2:
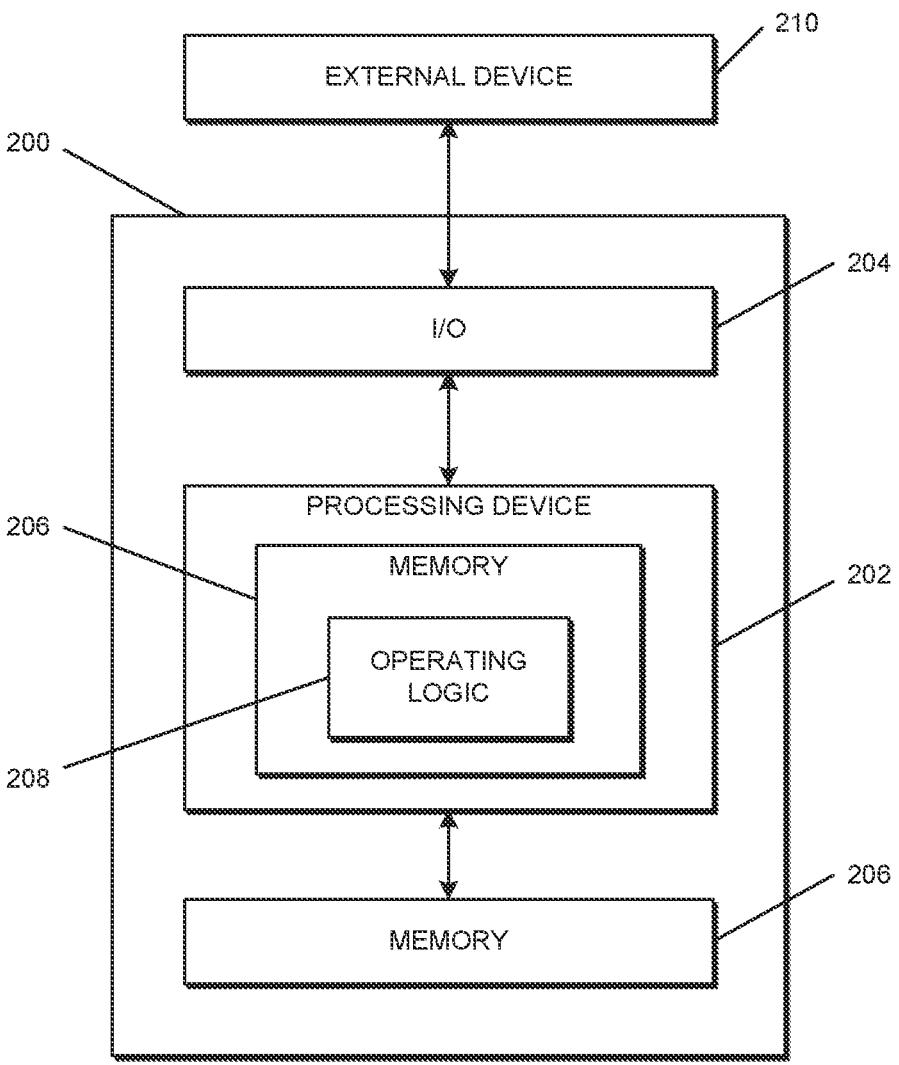
FIG. 2 is a simplified block diagram of at least one embodiment of a computing device.

It should be understood that any of the computer-implemented components, modules, or servers described in relation to FIG. 1 may be implemented via one or more types of computing devices, such as, for example, the computing device 200 of FIG. 2. As will be seen, the contact center system 100 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 100 may initiate inbound communications (e.g., telephone calls, emails, chats, etc.) to the contact center system 100 via a customer device 102. While FIG. 1 shows one such customer device—i.e., customer device 102—it should be understood that any number of customer devices 102 may be present. The customer devices 102, for example, may be a communication device, such as a telephone, smart phone, computer, tablet, or laptop. In accordance with functionality described herein, customers may generally use the customer devices 102 to initiate, manage, and conduct communications with the contact center system 100, such as telephone calls, emails, chats, text messages, web-browsing sessions, and other multi-media transactions.

Inbound and outbound communications from and to the customer devices 102 may traverse the network 104, with the nature of the network typically depending on the type of customer device being used and the form of communication. As an example, the network 104 may include a communication network of telephone, cellular, and/or data services. The network 104 may be a private or public switched telephone network (PSTN), local area network (LAN), private wide area network (WAN), and/or public WAN such as the Internet. Further, the network 104 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 106 may be coupled to the network 104 for receiving and transmitting telephone calls between customers and the contact center system 100. The switch/media gateway 106 may include a telephone or communication switch configured to function as a central switch for agent level routing within the center. The switch may be a hardware switching system or implemented via software. For example, the switch 106 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 118. Thus, in general, the switch/media gateway 106 establishes a voice connection between the customer and the agent by establishing a connection between the customer device 102 and agent device 118.

As further shown, the switch/media gateway 106 may be coupled to the call controller 108 which, for example, serves as an adapter or interface between the switch and the other routing, monitoring, and communication-handling components of the contact center system 100. The call controller 108 may be configured to process PSTN calls, VOIP calls, and/or other types of calls. For example, the call controller 108 may include computer-telephone integration (CTI) software for interfacing with the switch/media gateway and other components. The call controller 108 may include a session initiation protocol (SIP) server for processing SIP calls. The call controller 108 may also extract data about an incoming interaction, such as the customer's telephone number, IP address, or email address, and then communicate these with other contact center components in processing the interaction.

The interactive media response (IMR) server 110 may be configured to enable self-help or virtual assistant functionality. Specifically, the IMR server 110 may be similar to an interactive voice response (IVR) server, except that the IMR server 110 is not restricted to voice and may also cover a variety of media channels. In an example illustrating voice, the IMR server 110 may be configured with an IMR script for querying customers on their needs. For example, a contact center for a bank may instruct customers via the IMR script to "press 1" if they wish to retrieve their account balance. Through continued interaction with the IMR server 110, customers may receive service without needing to speak with an agent. The IMR server 110 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 112 may function to route incoming interactions. For example, once it is determined that an inbound communication should be handled by a human agent, functionality within the routing server 112 may select the most appropriate agent and route the communication thereto. This agent selection may be based on which available agent is best suited for handling the communication. More specifically, the selection of appropriate agent may be based on a routing strategy or algorithm that is implemented by the routing server 112. In doing this, the routing server

112 may query data that is relevant to the incoming interaction, for example, data relating to the particular customer, available agents, and the type of interaction, which, as described herein, may be stored in particular databases. Once the agent is selected, the routing server 112 may interact with the call controller 108 to route (i.e., connect) the incoming interaction to the corresponding agent device 118. As part of this connection, information about the customer may be provided to the selected agent via their agent device 118. This information is intended to enhance the service the agent is able to provide to the customer.

It should be appreciated that the contact center system 100 may include one or more mass storage devices—represented generally by the storage device 114—for storing data in one or more databases relevant to the functioning of the contact center. For example, the storage device 114 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 114 may store agent data in an agent database. Agent data maintained by the contact center system 100 may include, for example, agent availability and agent profiles, schedules, skills, handle time, and/or other relevant data. As another example, the storage device 114 may store interaction data in an interaction database. Interaction data may include, for example, data relating to numerous past interactions between customers and contact centers. More generally, it should be understood that, unless otherwise specified, the storage device 114 may be configured to include databases and/or store data related to any of the types of information described herein, with those databases and/or data being accessible to the other modules or servers of the contact center system 100 in ways that facilitate the functionality described herein. For example, the servers or modules of the contact center system 100 may query such databases to retrieve data stored therein or transmit data thereto for storage. The storage device 114, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 116 may be configured to record and aggregate data relating to the performance and operational aspects of the contact center system 100. Such information may be compiled by the statistics server 116 and made available to other servers and modules, such as the reporting server 134, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 118 of the contact center system 100 may be communication devices configured to interact with the various components and modules of the contact center system 100 in ways that facilitate functionality described herein. An agent device 118, for example, may include a telephone adapted for regular telephone calls or VOIP calls. An agent device 118 may further include a computing device configured to communicate with the servers of the contact center system 100, perform data processing associated with operations, and interface with customers via voice, chat, email, and other multimedia communication mechanisms according to functionality described herein. Although FIG. 1 shows three such agent devices 118—i.e., agent devices 118A, 118B and 118C—it should be understood that any number of agent devices 118 may be present in a particular embodiment.

The multimedia/social media server 120 may be configured to facilitate media interactions (other than voice) with the customer devices 102 and/or the servers 128. Such media interactions may be related, for example, to email, voice mail, chat, video, text-messaging, web, social media, co-browsing, etc. The multimedia/social media server 120 may take the form of any IP router conventional in the art with specialized hardware and software for receiving, processing, and forwarding multi-media events and communications.

The knowledge management server 122 may be configured to facilitate interactions between customers and the knowledge system 124. In general, the knowledge system 124 may be a computer system capable of receiving questions or queries and providing answers in response. The knowledge system 124 may be included as part of the contact center system 100 or operated remotely by a third party. The knowledge system 124 may include an artificially intelligent computer system capable of answering questions posed in natural language by retrieving information from information sources such as encyclopedias, dictionaries, newswire articles, literary works, or other documents submitted to the knowledge system 124 as reference materials. As an example, the knowledge system 124 may be embodied as IBM Watson or a similar system.

The chat server 126, it may be configured to conduct, orchestrate, and manage electronic chat communications with customers. In general, the chat server 126 is configured to implement and maintain chat conversations and generate chat transcripts. Such chat communications may be conducted by the chat server 126 in such a way that a customer communicates with automated chatbots, human agents, or both. In exemplary embodiments, the chat server 126 may perform as a chat orchestration server that dispatches chat conversations among the chatbots and available human agents. In such cases, the processing logic of the chat server 126 may be rules driven so to leverage an intelligent workload distribution among available chat resources. The chat server 126 further may implement, manage, and facilitate user interfaces (UIs) associated with the chat feature, including those UIs generated at either the customer device 102 or the agent device 118. The chat server 126 may be configured to transfer chats within a single chat session with a particular customer between automated and human sources such that, for example, a chat session transfers from a chatbot to a human agent or from a human agent to a chatbot. The chat server 126 may also be coupled to the knowledge management server 122 and the knowledge systems 124 for receiving suggestions and answers to queries posed by customers during a chat so that, for example, links to relevant articles can be provided.

The web servers 128 may be included to provide site hosts for a variety of social interaction sites to which customers subscribe, such as Facebook, Twitter, Instagram, etc. Though depicted as part of the contact center system 100, it should be understood that the web servers 128 may be provided by third parties and/or maintained remotely. The web servers 128 may also provide webpages for the enterprise or organization being supported by the contact center system 100. For example, customers may browse the webpages and receive information about the products and services of a particular enterprise. Within such enterprise webpages, mechanisms may be provided for initiating an interaction with the contact center system 100, for example, via web chat, voice, or email. An example of such a mechanism is a widget, which can be deployed on the webpages or websites hosted on the web servers 128. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 130 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 130 may be configured to interact with the routing server 112 for selecting an appropriate agent to handle each of the deferrable activities. Once assigned to a particular agent, the deferrable activity is pushed to that agent so that it appears on the agent device 118 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 118 may include a workbin. As an example, a workbin may be maintained in the buffer memory of the corresponding agent device 118.

The universal contact server (UCS) 132 may be configured to retrieve information stored in the customer database and/or transmit information thereto for storage therein. For example, the UCS 132 may be utilized as part of the chat feature to facilitate maintaining a history on how chats with a particular customer were handled, which then may be used as a reference for how future chats should be handled. More generally, the UCS 132 may be configured to facilitate maintaining a history of customer preferences, such as preferred media channels and best times to contact. To do this, the UCS 132 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 134 may be configured to generate reports from data compiled and aggregated by the statistics server 116 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 136 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 138 may be configured to provide systems and methods for performing analytics on data received from a plurality of different data sources as functionality described herein may require. In accordance with example embodiments, the analytics module 138 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 138 may have access to the data stored in the storage device 114, including the customer database and agent database. The analytics module 138 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 138 may be configured to retrieve data stored within the storage device 114 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 138 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 138 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 1 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VOIP calls), emails, vmails, video, chat, screen-sharing, text messages, social media messages, WebRTC calls, etc. Access to and control of the components of the contact center system 100 may be affected through user interfaces (UIs) which may be generated on the customer devices 102 and/or the agent devices 118.

As noted above, in some embodiments, the contact center system 100 may operate as a hybrid system in which some or all components are hosted remotely, such as in a cloud-based or cloud computing environment. It should be appreciated that each of the devices of the contact center system 100 may be embodied as, include, or form a portion of one or more computing devices similar to the computing device 200 described below in reference to FIG. 2.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein-such as the contact center system 100 of FIG. 1—the various servers and computer devices thereof may be located on local computing devices 200 (e.g., on-site at the same physical location as the agents of the contact center), remote computing devices 200 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IOT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry.

Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 3:
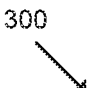
FIG. 3 is a simplified flow diagram of at least one embodiment of a method for grouping intent classes for error reduction.
Figure 3:
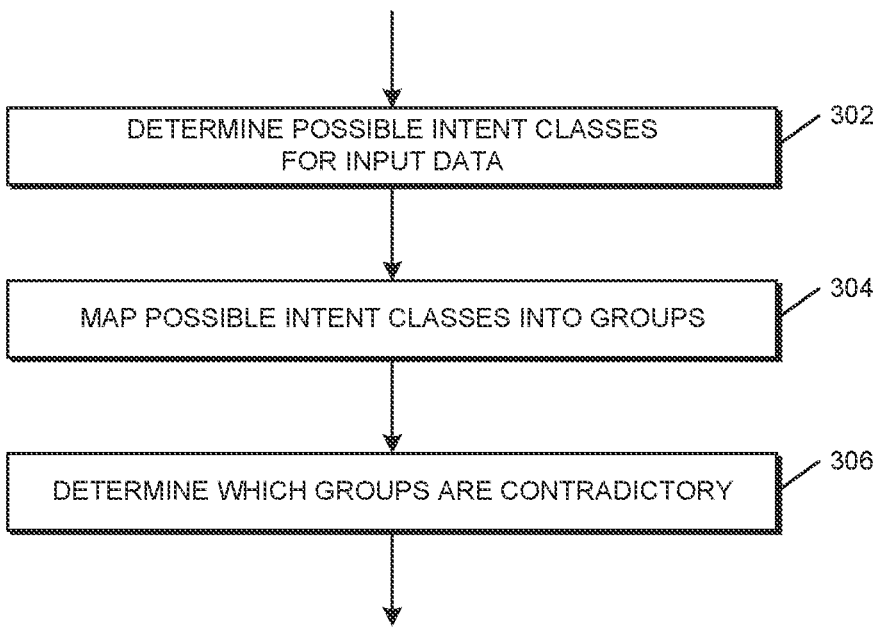

Referring now to FIG. 3, in use, a computing system (e.g., the contact center system 100 and/or computing device 200) may execute a method 300 for grouping intent classes for error reduction. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the computing system determines possible intent classes for input data. It should be appreciated that the different possible intent classes may vary depending on the particular context, domain, and/or implementation. For example, in an embodiment involving vetting leads, the intents/classes may include "interested," "not interested," "unsubscribe," "pricing FAQ," "wrong person," and/or other intents/classes. Although the input data are described herein with respect to textual information (e.g., paragraphs of text), it should be appreciated that the input data may be non-textual data in other embodiments (e.g., images for computer vision implementations, audio for audio-based implementations, other high-dimensional representation of data, etc.).

In block 304, the computing system maps the possible intent classes into groups based on some commonality across the intents/classes. In block 306, the computing system determines which groups are contradictory. It should be appreciated that the mappings of the intent classes into groups (e.g., class group definitions) and the determinations regarding which groups are contradictory (e.g., contradicting group definitions) may be stored in one or more databases and/or other data structures (e.g., for use by the system in executing the method 400, 500 described below).

In some embodiments, intent classes may be grouped into a "positive" group that includes positive intents, a "negative" group that includes negative intents, and a "neutral" group that includes neutral intents. For example, in the embodiment described above, the "positive" group may include the "interested" intent class and the "pricing FAQ" intent class, and the "negative" group may include the "not interested" intent class, the "unsubscribe" intent class, and the "wrong person" intent class. In some embodiments, a determined intent may trigger the computing system to perform one or more respective actions. Accordingly, in some embodiments, the possible intent classes may be grouped into different groups based on the respective actions triggered by the intents. Additionally or alternatively, in some embodiments, the possible intent classes may be grouped into different groups such that a mistake or misinterpretation of one intent as another intent within the same group would not significantly affect the analysis, process flow, and/or system. For example, in an embodiment, possible intent classes may be "interested," "not interested," and "call me," among others. If the intent classification model classifies something as an "interested" intent instead of a "call me" intent, the mistake may not be critical, and therefore it may be appropriate to map the "interested" intent and the "call me" intent to the same group. However, if the intent classification model classifies something as an "interested" intent instead of a "not interested" intent, the mistake is likely critical, and therefore it is may not be appropriate to map the "interested" intent and the "not interested" intent to the same group. Rather, it may be appropriate to map the "interested" intent and the "not interested" intent to different groups that are contradictory to one another (e.g., a "positive" group and a "negative" group). However, it should be appreciated that different implementations may utilize different groups depending on the particular context. Further, depending on the particular embodiments, groups may be predefined as being contradictory, inherently contradictory by nature, and/or otherwise determined to be contradictory by the system and/or system administrator. In other embodiments, each group may be considered to be contradictory to each other group. As indicated above, in some embodiments, each intent class may be treated as its own group.

Although the blocks 302-306 are described in a relatively serial manner, it should be appreciated that various blocks of the method 300 may be performed in parallel in some embodiments.

Figure 4:
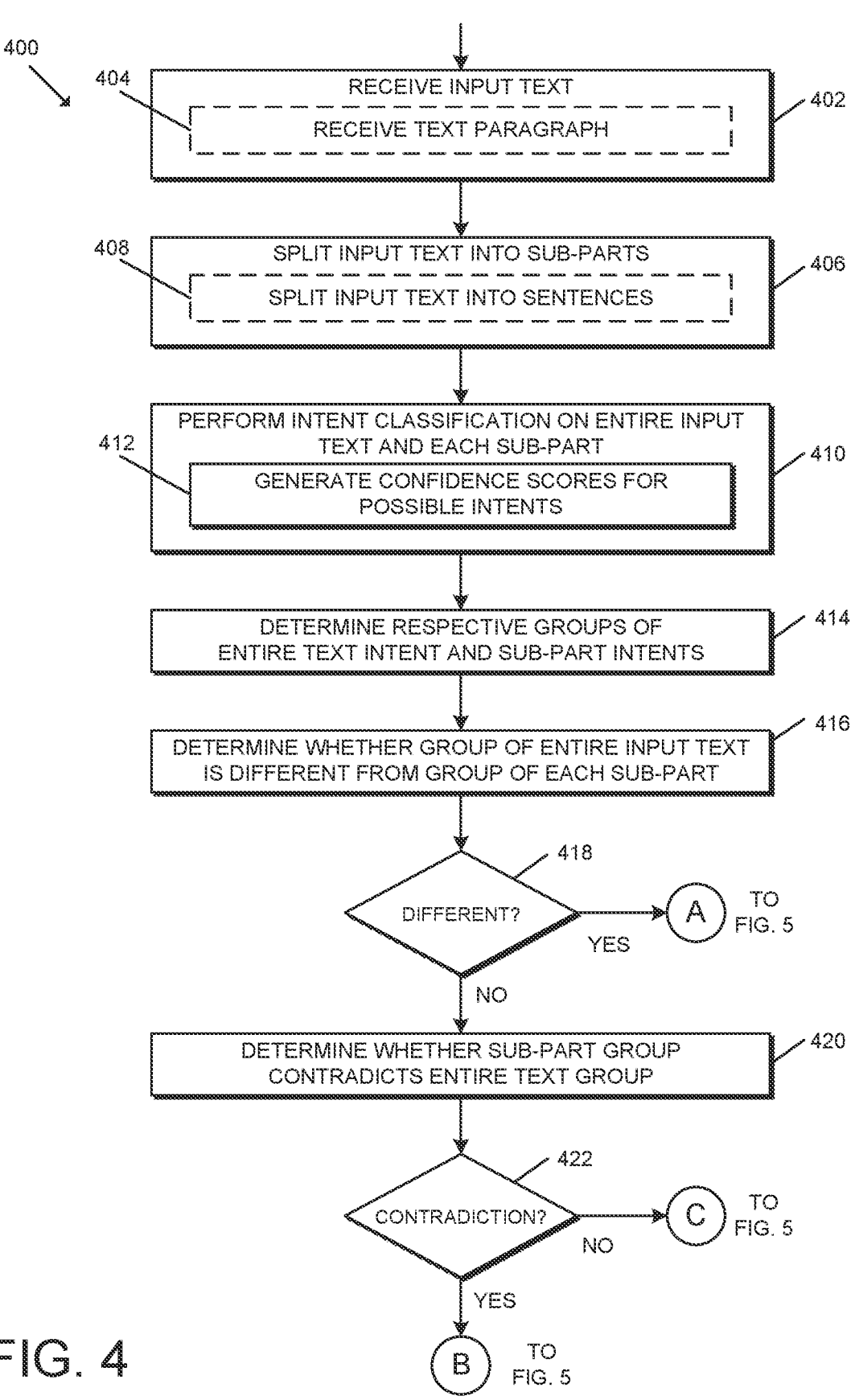
FIGS. 4-5 are a simplified flow diagram of at least one embodiment of a method for error reduction in intent classification.
Figure 5:
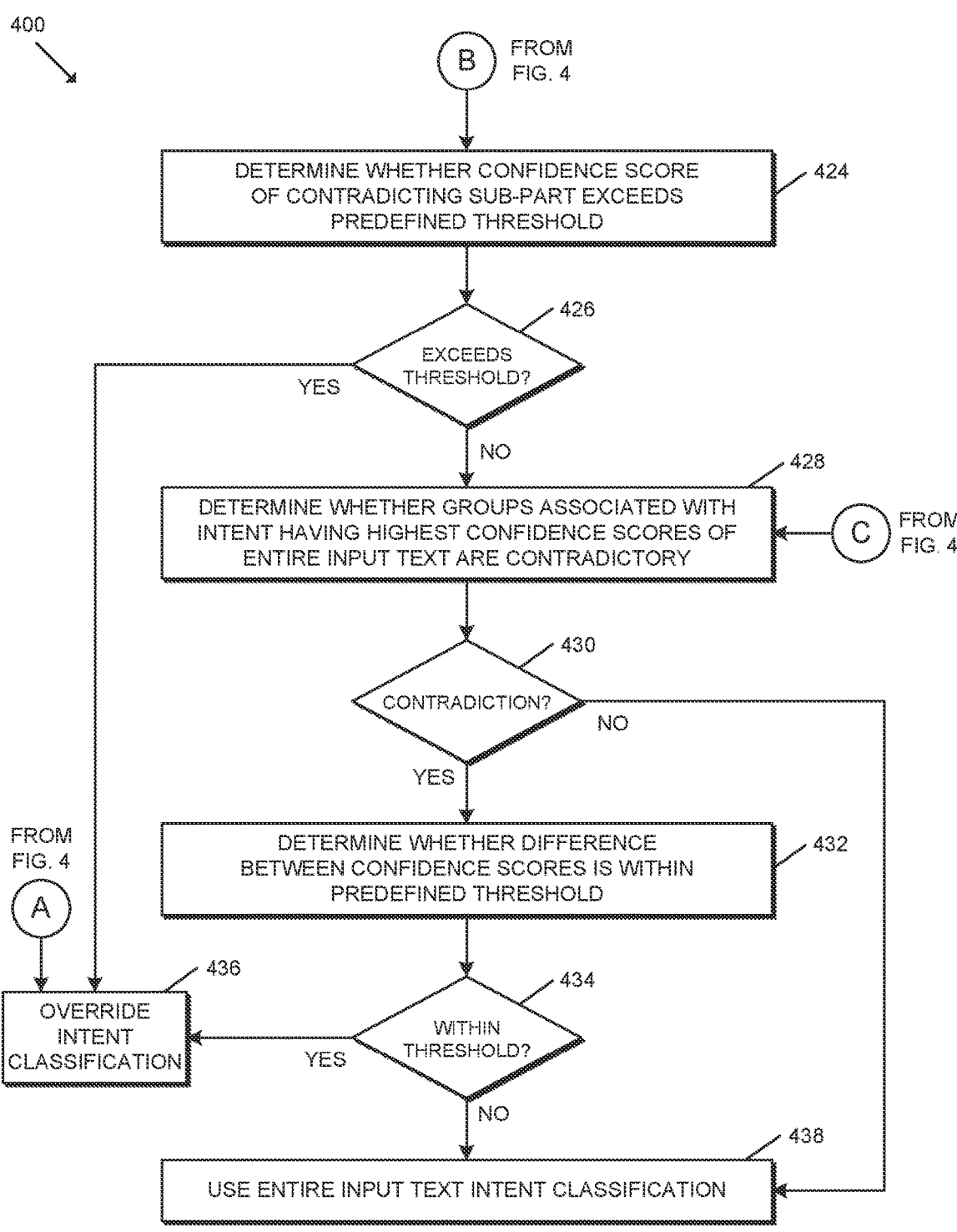

Referring now to FIGS. 4-5, in use, a computing system (e.g., the contact center system 100 and/or computing device 200) may execute a method 400 for error reduction in intent classification. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 of FIG. 4 in which the computing system receives a section of input text for which to classify the intent. More specifically, in block 404, the computing system may receive a text paragraph for which to classify the intent. In block 406, the computing system splits the section of input text into subparts. More specifically, in block 408, the computing system may split the section of input text (e.g., a text paragraph) into sentences. It should be appreciated that, in other embodiments, the section of input text to be classified may be a different section of text than a paragraph and/or the section of input text may be split into differently sized sub-parts. Further, although the section of text is described herein primarily as being split into sub-parts that are distinct from one another, in other embodiments, some content of the sub-parts may overlap one another. For example, in an embodiment, the computing system may split the section of input text into sub-parts using a running window of words of a fixed size (e.g., which may or may not overlap).

In block 410, the computing system performs intent classification on the section of input text as a whole to determine an intent of the section of input text, and also performs intent classification on each sub-part to determine a respective intent of each sub-part. In doing so, in block 412, the computing system may generate a confidence score for each of the possible intents (e.g., determined in block 302) based on the intent classification model, and may determine the possible intent with the greatest confidence score to be the intent of the input text and/or sub-part. For example, in some embodiments, the confidence score may be normalized between 0 and 1, with 0 being representative of zero confidence and 1 being representative of complete confidence.

In block 414, the computing system determines the group of the intent determined for the section of input text as a whole and the group of the respective intent determined for each of the sub-parts. As described above, it should be appreciated that the system may determine the associated group for a particular intent based on class group definitions stored in one or more databases and/or other data structures. For example, in an embodiment in which the section of input text is a paragraph having five sentences, the computing system may determine the group of the intent determined for the paragraph as a whole and the group of the intent of each of the five sentences. In block 416, the computing system determines whether the group of the intent determined for the section of input text as a whole is different from the group of the respective intent determined for each of the sub-parts. For example, the intent of a paragraph as a whole may be different from the intent of a sentence within that paragraph and, similarly, the group associated with the intent of the paragraph may be different from the group associated with the intent of a sentence within the paragraph.

If the computing system determines, in block 418, that the group of the intent determined for the section of input text as a whole is different from the group of the respective intent determined for each of the sub-parts, the method 400 advances to block 436 of FIG. 5 in which the computing system overrides the intent classification. That is, by default, the classification model may be designed to use the determined intent of the section of input text as a whole for further processing; however, in block 436, that intent classification may be overridden. In particular, in some embodiments, the classification may be escalated to a human for analysis. In other embodiments, the computing system may instead prioritize the intent of a sub-part over the intent of the section of the input text. In some embodiments, it should be appreciated that further conditions may be required in order for the method 400 to advance to block 436. For example, in some embodiments, the computing system may also have to additionally execute block 426 in the affirmative and/or block 434 in the affirmative in order (e.g., along with relevant intervening blocks) for the method 400 to advance to block 436 to override the intent classification.

Referring back to block 418, if the computing system determines that the group of the intent determined for the section of input text as a whole is not different from the group of the respective intents determined for each of the sub-parts, the method 400 advances to block 420 in which the computing system determines, for each of the sub-parts, whether a group of the intent associated with that respective sub-part contradicts the intent determined for the section of input text as a whole. As described above, it should be appreciated that the system may determine which groups contradict one another based on contradicting group definitions stored in one or more databases and/or other data structures.

If the computing system determines, in block 422, that the group of the intent associated with the section of input text as a whole does not contradict any respective sub-part group, then the method 400 advances to block 428 of FIG. 5. However, if the computing system determines, in block 422, that the group of at least one sub-part contradicts the group of the intent associated with the section of input text as a whole, then the method 400 advances to block 424 of FIG. 5 in which the computing system determines whether the confidence score of the intent of the contradicting sub-part exceeds a predefined threshold. For example, suppose a particular implementation has a "positive" group of intents and a "negative" group of intents, and the computing system has determined the intent of the section of input text as a whole to be an intent that is associated with the "positive" group. Further suppose that the predefined threshold is 0.8, the computing system has identifying a sub-part intent that belongs to a group that contradicts the "positive" group (e.g., it belongs to the "negative" group), and the confidence score of the intent of that sub-part is 0.9. In that case, the computing system determines that the confidence score has exceeded the predefined threshold. It should be appreciated that the predefined threshold may be established by the computing system and/or configured by a user (e.g., a system administrator) depending on the particular embodiment. It should be further appreciated that multiple sub-parts may have intents that are associated with contradictory groups relative to the group of the intent associated with the section of input text as a whole, in which case the computing system may analyze the confidence scores with respect to each contradicting sub-part.

If the computing system determines, in block 426, that the confidence score of the intent of a contradicting sub-part exceeds the predefined threshold, then the method 400 advances to block 436 in which the computing system overrides the intent classification as described above. However, if the computing system determines, in block 426, that none of the confidence scores of the respective intents of any contradicting sub-parts exceeds the predefined threshold, then the method 400 advances to block 428 in which the computing system determines whether the groups associated with the intents having the highest confidence scores from intent classification of the section of input text as a whole are contradictory. For example, in the illustrative embodiments, the computing system compares the group associated with the intent having the highest confidence score of the section of input text as a whole with the group of the intent having the second highest confidence score of the section of input text as a whole. However, it should be appreciated that the computing system may compare more than two of the highest confidence scores in other embodiments (e.g., three or more).

If the computing system determines, in block 430, that the groups associated with the intents having the highest confidences scores from intent classification of the section of input text as a whole are not contradictory, the method 400 advances to block 438 in which the computing system uses the intent of the section of input text as a whole for the intent classification and proceeds in accordance with that determined intent. For example, in an embodiment in which the intent classification is being used by an automated agent (e.g., a chatbot), the automated agent may retrieve a set of functions to be executed and/or data to be transmitted that correspond with the determined intent.

However, if the computing system determines, in block 430, that the groups associated with the intents having the highest confidences scores from intent classification of the section of input text as a whole are contradictory, the method 400 advances to block 432 in which the computing system determines whether the difference between those confidence scores is within a predefined threshold or delta. As with the predefined threshold described in reference to block 424, it should be appreciated that the predefined threshold described in reference to block 432 may be established by the computing system and/or configured by a user (e.g., a system administrator) depending on the particular embodiment. It should be further appreciated that the two predefined thresholds may be different. Additionally, in embodiments in which more than two confidence scores are compared as described above, it should be appreciated that each confidence score may be compared to each other confidence score.

If the computing system determines, in block 434, that the difference between the confidence scores is within the predefined threshold, the method 400 advances to block 436 in which the computing system overrides the intent classification as described above. If the computing system determines, in block 434, that the difference between the confidence scores is not within the predefined threshold, the method 400 advances to block 438 in which the computing system uses the intent of the section of input text as a whole for intent classification and proceeds in accordance with that determined intent. By way of example, suppose the top two confidence scores for determining the intent were "interested" at 0.38 and "call me" at 0.37, that both intents belonged to the "positive" group, and the predefined threshold was 0.05. Because both intents belong to the same group (e.g., "positive") and, therefore, do not belong to contradictory groups, the difference between the confidence scores is unimportant, for example, as an error in the intent determination may not be critical. However, suppose the top two confidence scores for determining the intent were "interested" at 0.38 and "not interested" at 0.37, that the two intents belonged to contradictory groups (e.g., "positive" and "negative"), and the predefined threshold was 0.05. In such a circumstances, the difference between the two contradictory confidence scores is 0.01, which is within the predefined threshold of 0.05, and therefore the intent classification is overridden (e.g., potentially escalated to a human for intervention) as the error may be critical.

Although the blocks 402-438 are described in a relatively serial manner, it should be appreciated that various blocks of the method 400 may be performed in parallel in some embodiments.

What is claimed is:

1. A method for error reduction in intent classification, the method comprising:

determining, by a computing system of a contact center system, a set of possible intent classes for a section of input text obtained by the contact center system from a customer device;

mapping each of the possible intent classes for the section of input text into a respective group of a plurality of groups, including determining each group as a function of a corresponding action to be performed by the contact center system in response to a determination that a corresponding intent has been detected within the input text;

determining, by the computing system, which groups of the plurality of groups are contradictory to one or more other groups of the plurality of groups;

splitting, by the computing system, the section of input text into a plurality of sub-parts;

performing, by the computing system, intent classification on the section of input text to determine an intent of the section of input text and on each sub-part of the plurality of sub-parts to determine a respective intent of each sub-part;

evaluating, by the computing system, the determined intent of the section of input text and the respective intents of the sub-parts for intent contradiction, including determining whether a confidence score associated with the determined intent of each sub-part of the plurality of sub-parts is greater than a predefined threshold; and overriding, by the computing system and in response to a determination that the confidence score associated with the determined intent of at least one sub-part is greater than the predefined threshold, the determined intent of the section of input text in response to identifying an intent contradiction to provide error reduction in the intent classification.

2. The method of claim 1, wherein the section of input text comprises a paragraph of text and each sub-part of the plurality of sub-parts of the input text comprises a sentence of the paragraph.

3. The method of claim 1, wherein the plurality of groups comprises at least a first group of positive intents and a second group of negative intents.

4. The method of claim 1, wherein overriding the determined intent of the section of input text comprises escalating an interaction associated with classification of the section of input text to a human.

5. The method of claim 1, wherein overriding the determined intent of the section of input text comprises prioritizing the intent of a sub-part of the plurality of sub-parts over the intent of the section of input text.

6. The method of claim 1, wherein evaluating the determined intent of the section of input text and the respective intents of the sub-parts for intent contradictions comprises determining, for each sub-part of the plurality of sub-parts, whether a group associated with the determined intent of the sub-part contradicts a group associated with the determined intent of the section of input text.

7. The method of claim 1, wherein performing the intent classification on the section of input text to determine the intent of the section of input text comprises generating a confidence score for each possible intent based on the section of input text;

wherein evaluating the determined intent of the section of input text and the respective intents of the sub-parts for intent contradictions comprises (i) determining whether a group associated with a possible intent for the section of input text having a highest confidence score contradicts a group associated with a possible intent for the section of input text having a second highest confidence score, and (ii) determining whether a difference between the highest confidence score and the second highest confidence score is within a predefined threshold.

8. The method of claim 1, wherein performing intent classification comprises generating a respective confidence score for each possible intent classification based on an intent classification model.

9. The method of claim 1, further comprising performing an action based on the determined intent of the section of input text in response to determining not to override the determined intent of the section of input text.

10. A system for error reduction in intent classification, the system comprising:

at least one processor; and at least one memory comprising a plurality of instructions stored therein that, in response to execution by the at least one processor, causes the system to:

determine a set of possible intent classes for a section of input text obtained by a contact center system from a customer device;

map each of the possible intent classes for the section of input text into a respective group of a plurality of groups based at least in part on a determination of each group as a function of a corresponding action to be performed by the contact center system in response to a determination that a corresponding intent has been detected within the input text;

determine which groups of the plurality of groups are contradictory to one or more other groups of the plurality of groups;

split the section of input text into a plurality of sub-parts;

perform intent classification on the section of input text to determine an intent of the section of input text and on each sub-part of the plurality of sub-parts to determine a respective intent of each sub-part;

evaluate the determined intent of the section of input text and the respective intents of the sub-parts for intent contradiction, wherein to evaluate the determined intent includes to determine whether a confidence score associated with the determined intent of each sub-part of the plurality of sub-parts is greater than a predefined threshold; and override, in response to a determination that the confidence score associated with the determined intent of at least one sub-part is greater than the predefined threshold, the determined intent of the section of input text in response to identification of an intent contradiction to provide error reduction in the intent classification.

11. The system of claim 10, wherein the section of input text comprises a paragraph of text and each sub-part of the plurality of sub-parts of the input text comprises a sentence of the paragraph.

12. The system of claim 10, wherein the plurality of groups comprises at least a first group of positive intents and a second group of negative intents.

13. The system of claim 10, wherein to override the determined intent of the section of input text comprises to forward an interaction associated with classification of the section of input text to a human.

14. The system of claim 10, wherein to override the determined intent of the section of input text comprises to prioritize the intent of a sub-part of the plurality of sub-parts over the intent of the section of input text.

15. The system of claim 10, wherein to evaluate the determined intent of the section of input text and the respective intents of the sub-parts for intent contradictions comprises to determine, for each sub-part of the plurality of sub-parts, whether a group associated with the determined intent of the sub-part contradicts a group associated with the determined intent of the section of input text.

16. The system of claim 10, wherein to perform the intent classification on the section of input text to determine the intent of the section of input text comprises to generate a confidence score for each possible intent based on the section of input text;

wherein to evaluate the determined intent of the section of input text and the respective intents of the sub-parts for intent contradictions comprises to (i) determine whether a group associated with a possible intent for the section of input text having a highest confidence score contradicts a group associated with a possible intent for the section of input text having a second highest confidence score, and (ii) determine whether a difference between the highest confidence score and the second highest confidence score is within a predefined threshold.

17. The system of claim 10, wherein to perform intent classification comprises to generate a respective confidence score for each possible intent classification based on an intent classification model.

18. The system of claim 10, wherein the plurality of instructions further causes the system to perform an action based on the determined intent of the section of input text in response to a determination not to override the determined intent of the section of input text.

* * * * *